United States Patent [19]

Gates

[11] Patent Number: 5,592,966

[45] Date of Patent: Jan. 14, 1997

[54] BACK-FLOW PREVENTER

[75] Inventor: Alan J. Gates, 9735 Chillicothe Rd., Unit No. 41, Kirtland, Ohio 44094

[73] Assignee: Alan J. Gates, Laurinburg, N.C.

[21] Appl. No.: 401,954

[22] Filed: Mar. 10, 1995

[51] Int. Cl.$^6$ .............................. F16K 21/02; F16K 15/14

[52] U.S. Cl. ...................... 137/513.5; 137/515; 137/518; 137/849

[58] Field of Search .................................. 137/515, 515.7, 137/517, 518, 521, 513.5, 847, 849

[56] References Cited

U.S. PATENT DOCUMENTS

| | | | |
|---|---|---|---|
| 2,347,988 | 5/1944 | Burke | 137/849 X |
| 2,524,764 | 10/1950 | Burke | 137/849 X |
| 2,670,757 | 3/1954 | Delany | 137/849 X |
| 2,850,102 | 9/1958 | Brown | 137/847 X |
| 3,174,434 | 3/1965 | Schieve | 137/849 X |
| 3,565,106 | 2/1971 | Baumbach | 137/847 X |
| 3,861,416 | 1/1975 | Wichterle | 137/849 |
| 4,465,102 | 8/1984 | Rupp | 137/847 X |
| 4,993,452 | 2/1991 | Hough | 137/515.7 |
| 5,324,270 | 6/1994 | Kayan et al. | 137/847 X |

*Primary Examiner*—John Rivell
*Attorney, Agent, or Firm*—Renner, Kenner, Greive, Bobak, Taylor, Weber

[57] ABSTRACT

The present invention is directed to a multi-cuspid back-flow preventer in the nature of a check valve that has a generally annular body portion with axially spaced upstream and downstream ends. A substantially cylindrical passageway extends through the body portion, and a plurality of circumferentially adjacent valve cuspids are connected to the downstream end of the body portion for selectively opening and closing the passageway that extends therethrough. Each valve cuspid is marginated by a rib that extends into the passageway. Breather slots are provided between the successively adjacent valve cuspids, and a mounting flange may be provided at the upstream end of the body portion.

8 Claims, 3 Drawing Sheets

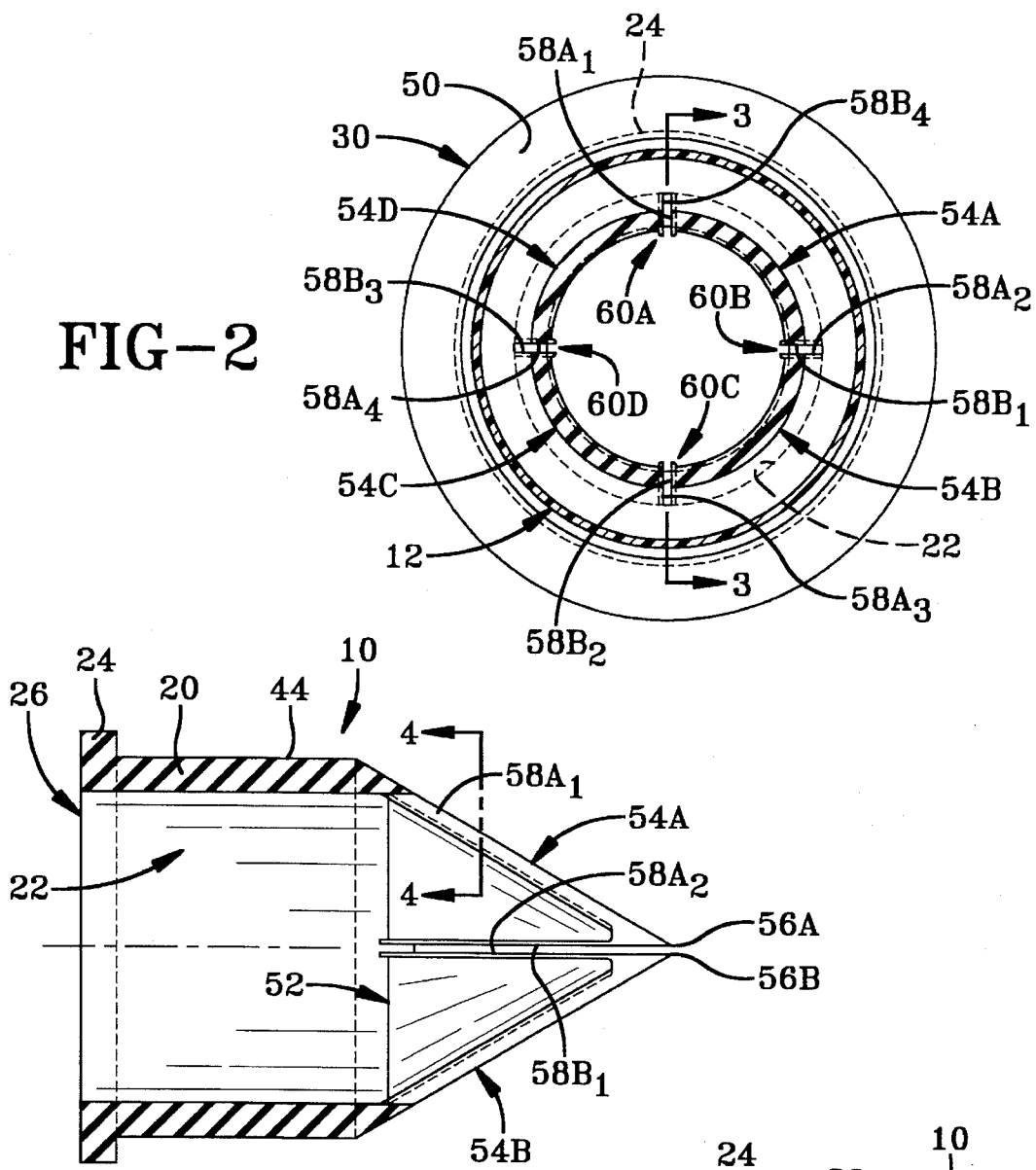

BACK-FLOW PREVENTER

TECHNICAL FIELD

The present invention relates generally to a drain apparatus of the type particularly adapted for use in conjunction with household appliances. More particularly, the present invention relates to a uni-directional flow control member that may be associated with a connection between the discharge fitting of a household appliance and a drain hose through which waste water exits from the household appliance into a sanitary system. Specifically, the present invention relates to the unique configuration of a back-flow preventer that not only precludes any waste water in the drain hose from back-flowing into the household appliance but also alleviates heat retention in the waste water discharge pump, provides the desired back pressure for most efficient operation of the waste water discharge pump and effects an increase in the velocity of the waste water as it exits the back-flow preventer and enters the drain hose.

BACKGROUND OF THE INVENTION

Household appliances such as dishwashers and clothes washers typically have a plurality of cycles that require the introduction of clean water into the appliance. For instance, a clothes washer may have a soak cycle, a wash cycle, and a rinse cycle. Clean water is introduced into the appliance at the beginning of each of these cycles. However, before the clean water is introduced, any waste water present at the conclusion of the previous cycle in the operation of the appliance is discharged. The term "waste water" is used to designate water that has been used in one of the appliance cycles and is contaminated with soap, dirt, or the like. Waste water is typically discharged from the appliance into a sanitary system by a waste water discharge pump. The pump forces the waste water from the appliance, through a drain hose and into a stand pipe (or other drain) that communicates with the sanitary system.

A certain amount of back pressure is required for the most efficient operation of the waste water discharge pump, but only during operation of the pump. Back pressure that develops in the drain hose subsequent to the cyclic operation of the waste water discharge pump can result in reverse flow of the waste water through the waste water discharge pump and into the appliance. This occurrence is known as back-flow, and back-flow is undesirable not only because it contaminates the clean water introduced into the appliance during at least the subsequent cycle in the operation of the appliance but also because the existence of back-flow during operation of the pump can excessively increase the pressure head against which the waste water discharge pump must operate, which can damage the pump. To ensure against the undesirable effects of back-flow, a check valve, or back-flow preventer, is installed in the waste water discharge path, in order to assure a uni-directional flow of fluid therethrough.

One type of well known back-flow preventer commonly in use is typically referred to as a "duck call" check valve. A duck call check valve is manufactured by a two-step process. In the first step the substantially hollow, annular body of the valve—with a diagonally disposed divider wall extending across the hollow interior of the body portion - is molded. In the second step the liquid passageway is formed by slitting a portion of the annular body portion to which the downstream end of the diagonal divider wall joins the cylindrical interior surface of the body portion. In its final form, the valve comprises a generally annular body with an inner valve flap that extends diagonally across the interior of the otherwise hollow, annular interior of the body portion. The resulting configuration provides a normally closed check valve.

The exterior configuration of such a valve is reminiscent of a duck call. Hence, the name duck call check valve is commonly applied to such a valve. When fluid is forced through a duck call check valve, the fluid pressure acts against the valve member, forcing the valve member to fold laterally along a longitudinal reference plane and separate from the interior surface of the valve body along the location where the valve member had been slit during the manufacturing process, thereby creating a passageway through the valve. When fluid tries to flow back through the duck call check valve, the fluid pressure acts against the upstream surface on the valve member, thereby either closing the passageway or assuring that it remains closed inasmuch as the valve member tends to unfold to its closed position when the pressure of the exiting flow drops below a given value for the particular check valve.

One undesirable aspect of most prior art check valves employing resilient valve members, such as the duck call check valve, is the need to utilize a two-step manufacturing process. The second manufacturing step—which often requires an intermediate handling, or positioning, step (as exemplified by the need to slit the body portion when making a duck call check valve)—considerably increases the cost of the valve. The design of the valve is also undesirable in that the pressure required to open the passageway increases the amount of work that the waste water discharge pump must perform. That is, the effort required to maintain the valve in the open position imposes excessive back pressure on the waste water discharge pump.

Another undesirable aspect of the duck call check valve is the shape, and location, of the passageway once it is opened. The eccentricity of the passage through a duck call check valve unduly increases resistance to fluid flow and decreases the efficiency of the waste water removal system. When water is flowing through the duck call check valve, the opened passageway is disposed along one side of the cylindrical passage therethrough. As the water exits the valve, it collides with the corrugated interior surface of the drain hose and the velocity of the exiting fluid decreases, thereby increasing back pressure.

The duck call check valve, and most other back-flow preventer valves, are normally closed. A normally closed valve precludes heat dissipation from the pump outwardly through the drain hose when the pump is not operating.

SUMMARY OF THE INVENTION

It is, therefore, a primary object of the present invention to provide a back-flow preventer that assures efficient, uni-directional fluid flow therethrough.

It is another object of the present invention to provide a back-flow preventer, as above, having a configuration such that it can be manufactured in a single step.

It is a further object of the present invention to provide a back-flow preventer, as above, that incorporates breather means which permit the dissipation of heat therethrough whenever the valve member is not closed by back pressure.

It is yet another object of the present invention to provide a back-flow preventer, as above, that provides controlled resistance to the passage of fluid being discharged therethrough so as to provide the back pressure necessary to the most efficient operation of the pump and simultaneously to increase the velocity of the waste water exiting the back-flow preventer into even a corrugated drain hose.

It is an even further object of the present invention to provide a back-flow preventer, as above, having valve means and breather means the closure of both of which is rapidly responsive to back pressure.

It is still a further object of the present invention to provide a back-flow preventer, as above, that can be conveniently installed in existing home appliances.

These and other objects of the invention, as well as the advantages thereof over existing and prior art forms, which will be apparent in view of the following detailed specification, are accomplished by means hereinafter described and claimed.

In general a back-flow preventer embodying the concepts of the present invention has a generally annular body portion with axially spaced upstream and downstream ends. A substantially cylindrical passageway extends through the body portion, and a plurality of circumferentially adjacent, but spaced, conically disposed cusp means are connected to the downstream end of the body portion for selectively opening and closing the passageway that extends therethrough. Each cusp means is margined by a rib that extends into the passageway.

One exemplary embodiment of a back-flow preventer embodying the concepts of the present invention—as well as two representative installation arrangements—are described in detail and are deemed sufficient to effect a full disclosure of the subject invention. Although the exemplary embodiment of the back-flow preventer is described in detail, it is done so without attempting to show all of the various forms and modifications in which the invention might be embodied, the invention being measured by the appended claims and not by the details of the specification.

BRIEF DESCRIPTION OF THE DRAWINGS

FIG. 2 is an cross section taken substantially along line 2—2 of FIG. 1;

FIG. 3 is a cross-section of the back-flow preventer taken substantially along line 3—3 of FIG. 2;

FIG. 4 is an enlarged portion of FIG. 3 taken substantially along line 4—4 of FIG. 3;

DESCRIPTION OF AN EXEMPLARY EMBODIMENT

Figure 1:
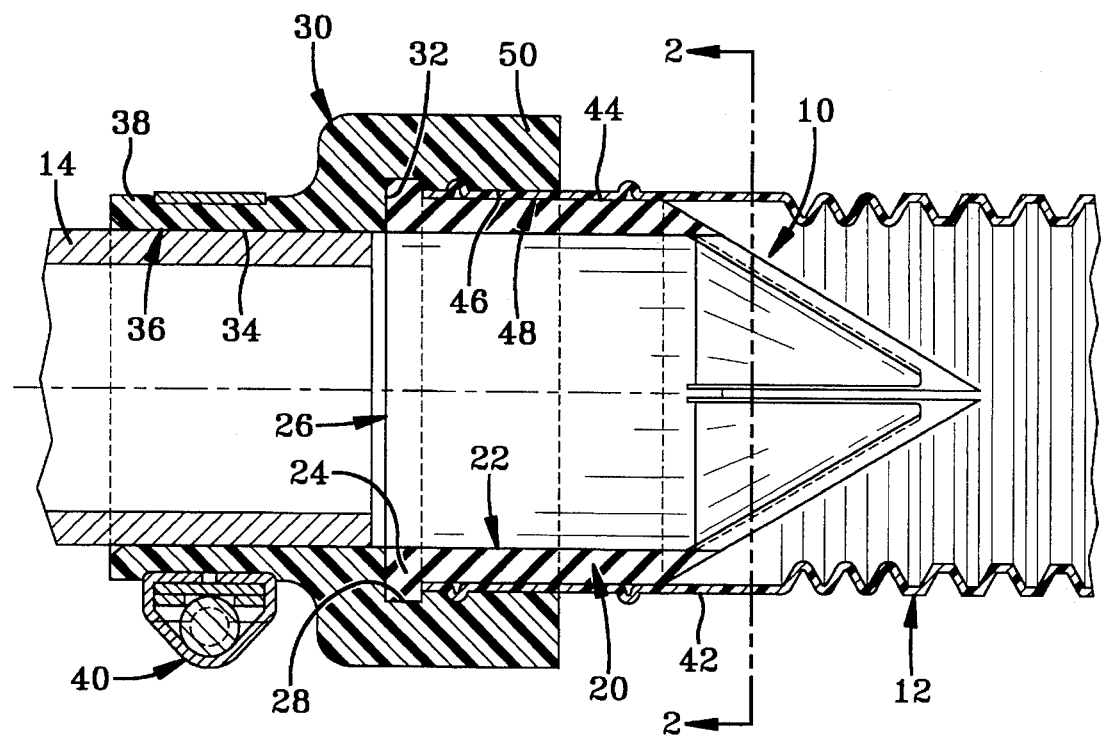
FIG. 1 is a side view, partially broken away, of the back-flow preventer installed between a corrugated drain hose and a waste water discharge pump outlet fitting.

One representative form of a back-flow preventer embodying the concepts of the present invention is designated generally by the numeral 10 on the accompanying drawings. As depicted in FIG. 1, and as will be hereinafter described in detail, the representative back-flow preventer 10 is a multi-cuspid check valve arrangement that is disposed substantially at the juncture of a corrugated, polypropylene drain hose 12 and a representative, tubular, discharge pump outlet fitting 14. The drain hose discharges into a stand pipe (not shown) or empties into a drain (also not shown). The pump outlet fitting 14 provides a passageway through which a pump in the appliance may discharge waste water. The back-flow preventer 10 allows the waste water to be readily discharged therethrough but prevents the waste water from back-flowing into the pump outlet fitting 14.

In the preferred embodiment of the present invention, the back-flow preventer 10 has a generally annular body portion 20 with a substantially cylindrical passageway 22 extending therethrough. A cylindrical mounting flange 24 extends radially outwardly from the upstream end 26 of the annular body portion 20. The flange 24 may be used for mounting the back-flow preventer 10. For example, the flange 24 may be received in an annular recess 28 in a stepped connecting cuff 30. The upstream wall 32 of the recess 28 constitutes a shoulder that is disposed radially to engage, and be engaged by, the mounting flange 24. The radially inner end of the upstream, shoulder-forming wall 32 terminates at the peripheral surface 34 of the cylindrical inner passage 36 through the stepped-down portion 38 of the connector cuff 30. The inner diameter of the passage 36 is preferably substantially the same as the outer diameter of the discharge pump outlet fitting 14 so that the outlet fitting 14 may be slidably received in the passage 36 and be demountably secured thereto by a typical hose clamp 40.

An annular extension cuff 42 is provided on the corrugated drain hose 12. The annular extension cuff 42 is received over the cylindrical outer surface 44 on the annular body portion 20 of the back-flow preventer 10, and a portion of the annular extension cuff 42, together with a length of the annular body portion 20 which the extension cuff 42 overlies, are disposed in contiguous juxtaposition with the peripheral surface 46 of the inner passage 48 through the stepped-up portion 50 of the connector cuff 30. If the connector cuff 30 is made, for example, of a thermoplastic elastomer (hereinafter designated as a TPE) and the extension cuff 42 is made of a polypropylene, the body portion of the backflow preventer 10 (which may be a molded thermoplastic, or thermoset, elastomer), the extension cuff 42 of the drain hose 12 and the connecting cuff 30 may be heat-bonded into an integral assembly.

Figure 1A:
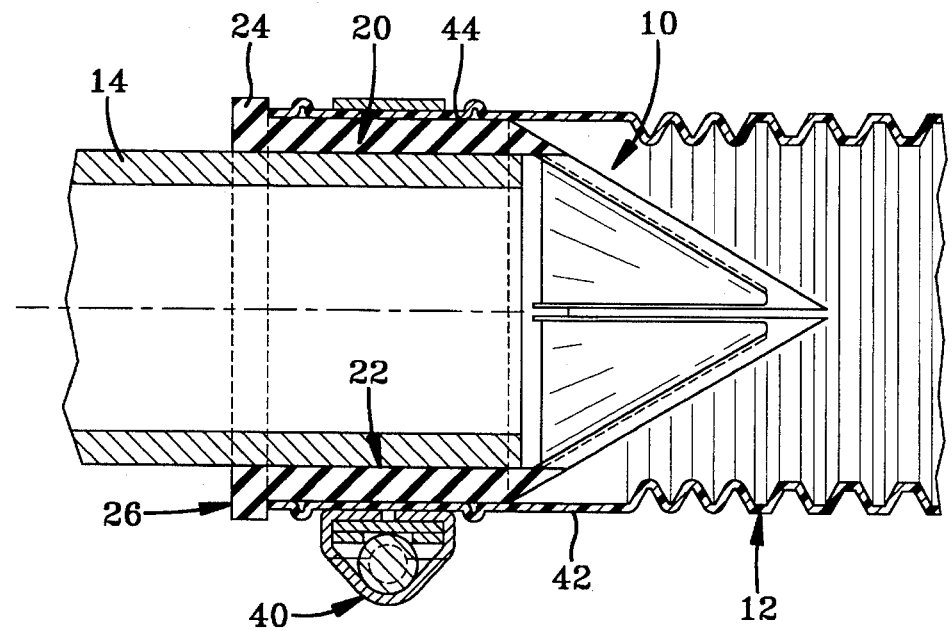
FIG. 1A is a view similar to FIG. 1, but depicting an alternative arrangement by which to install the back-flow preventer between a corrugated drain hose and a waste water discharge pump outlet fitting.

Alternatively, and as depicted in FIG. 1A, the back-flow preventer 10 may be bonded to the interior of the annular extension cuff 42 to complete the assembly. In the arrangement depicted in FIG. 1A—because the internal diameter of the cylindrical passageway 42 through the body portion is preferably identical to the internal diameter of the peripheral surface 34 of the inner passage 36 through the stepped-down portion 38 of the connector cuff 30—the back-flow preventer 10 may be connected directly to the pump outlet fitting 14 and secured thereto by a hose coupling 40. In this arrangement the back-flow preventer 10 need not be bonded to the extension cuff 42 of the drain hose 12 inasmuch as the hose clamp 40 can simultaneously secure both members to the outer cylindrical surface of the pump outlet fitting 14, thus enhancing the ability to insert a back-flow preventer 10 embodying the concepts of the present invention as an after-market item.

The downstream end of the annular body portion 20 terminates in a frusto-conical transition 52 from which a plurality of cuspids, or conically curved valve flaps, 54 extend at preferably the same angular inclination as the exterior of the frusto-conical transition 52. The quad-cuspid back-flow preventer 10 depicted provides all the desired functions attributable to the present invention. However, a lesser or a greater number of cuspids 54 might well be employed to achieve the desired results for a given installation.

Each cuspid terminates in a pointed apex 56 that delineates the downstream extent of the back-flow preventer 10. Each cuspid 54 has lateral edges 58 that extend to, and form, the pointed apices 56. That is, edges $58A_1$ and $58B_1$ on cuspid 54A meet at apex 56A. Similarly, edges $58A_2$ and $58B_2$ on cuspid 54B meet at apex 56B; edges $58A_3$ and $58B_3$ on cuspid 54C meet at apex 56C; and edges $58A_4$ and $58B_4$ on cuspid 54D meet at apex 56D. The laterally adjacent edges on the successive cuspids are spaced, as represented at 60, when the back-flow preventer 10 is unstressed. That is, the successive cuspids 54 are adjacent, but spaced, when fluid is not being discharged and when there is no back-flow.

Thus, and as is perhaps best observed in FIG. 2, space 60A is provided between the edge $58B_4$ on cuspid 54D and the opposed edge $58A_1$ on cuspid 54A. Similarly, space 60B is provided between the edge $58B_1$ on cuspid 54A and the opposed edge $58A_2$ on cuspid 54B; space 60C is provided between the edge $58B_2$ on cuspid 54B and the opposed edge $58A_3$ on cuspid 54C; and, space 60D is provided between the edge $58B_3$ on cuspid 54C and the opposed edge $58A_4$ on cuspid 54D.

As previewed in the previous paragraph, and as will appear in the detailed description which follows, a particular structural member, component or arrangement may be employed at more than one location. When referring generally to that type of structural member, component or arrangement a common numerical designation shall be employed. However, when one of the structural members, components or arrangements so identified is to be individually identified it shall be referenced by virtue of a letter suffix employed in combination with the numerical designation employed for general identification of that structural member, component or arrangement. Thus, there are at least two cuspids which are generally identified by the numeral 54, but the specific, individual cuspids are, therefore, identified as 54A, 54B, 54C and 54D in the specification and on the drawings. Each cuspid 54 also has a pair of lateral edges 58A and 58B, and the lateral edges are similar to each other on each cuspid and the successive cuspids have similar edges. The lateral edges in each cuspid shall, therefore, be identified by the suffix convention described above. However, the lateral edges on successive cuspids shall be further designated by a numerical subscript. These suffix and subscript conventions shall be employed throughout the specification.

The lateral edges 58 of each cuspid 54 is marginated by a rib 62 that extends radially inwardly from the curved medial surface 64 on each cuspid 54. That is, ribs $62A_1$ and $62B_1$ are provided on cuspid 54A; ribs $62A_2$ and $62B_2$ are provided on cuspid 54B; ribs $62A_3$ and $62B_3$ are provided on cuspid 54C; and, ribs $62A_4$ and $62B_4$ are provided on cuspid 54D. As will become more fully apparent, the ribs 62 perform several functions in the operation of the back-flow preventer 10. Specifically, the ribs 62 effect an increase in the bending strength of the individual cuspids 54 without destroying the boundary layer in the hydraulic flow of the waste water being discharged through the back-flow preventer; and, they enhance the contact area between successively adjacent cuspids 54 in response to back-flow.

It should be appreciated that the structural details of the back-flow preventer 10 described herein readily lend themselves to being molded with heat, and/or cooling, in a one-step process.

Operation

Figure 5:
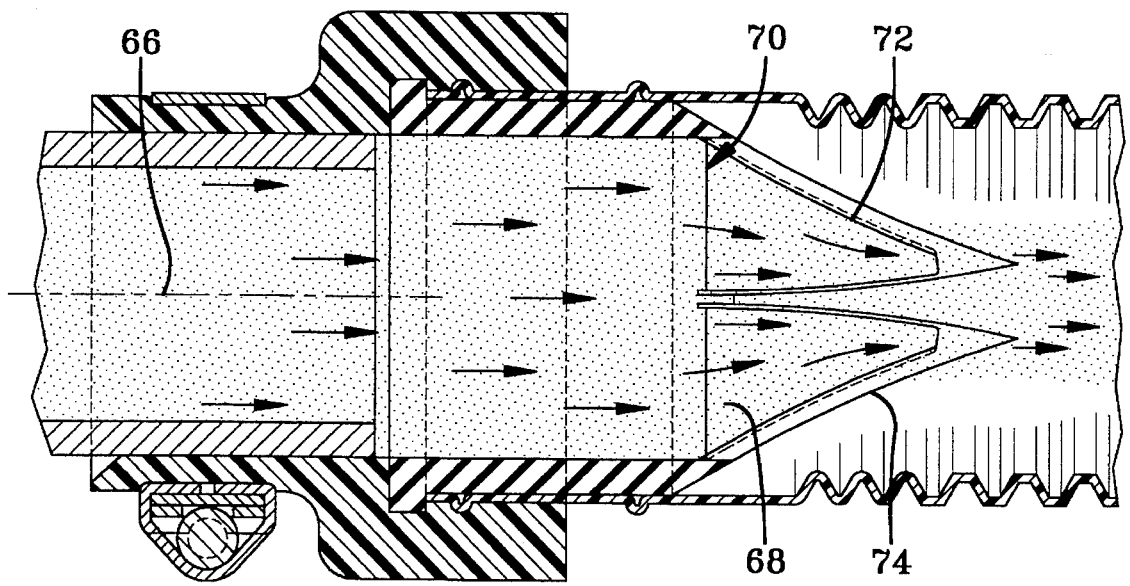
FIG. 5 is a cross-section similar to FIG. 1, but depicting the back-flow preventer with the waste fluid flowing therethrough; and, FIG. 6 is a view similar to FIG. 5 but depicting the back-flow preventer closed in response to back pressure.
Figure 6:
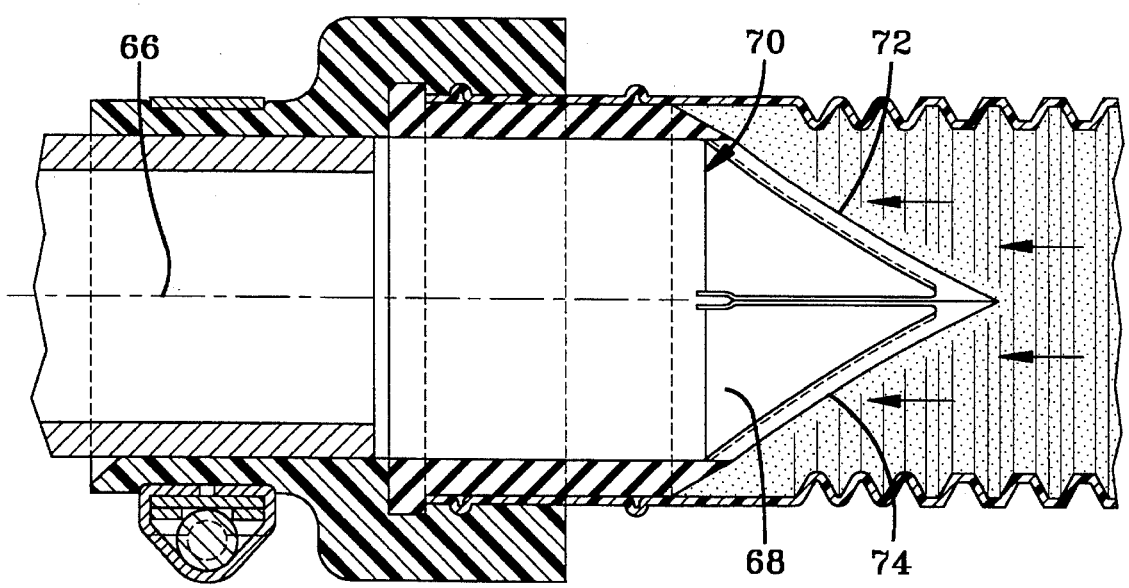

When the discharge pump in the appliance is pumping waste water out of the appliance through the back-flow preventer 10, the back-flow preventer is in an open position, as represented in FIG. 5. In the open position, the force of the flowing waste water forces the cuspids 54 to bend outwardly away from the centerline 66 of the back-flow preventer 10. As the cuspids bend in response to the flow of waste water through the back-flow preventer, the lateral edges 58 of the successively spaced cuspids 54 are no longer parallel, and the spaces 60 therebetween open. In the open position, the cylindrical passageway 22 merges into the tapering orifice 68 defined by the combined interior surface 70 of the frusto-conical transition 52 and the successive cuspids 54. That is, the reduction in the diameter of the cylindrical passageway 22 to the progressively constricted diameter of the orifice 68 continues outwardly along the cuspids 54 to a medial location, as represented at 72, at which point the tips continue to flare into the stream of exiting fluid which has now expanded progressively outwardly through the divergingly increasing spaces 60. The effect of the diametral reduction of the orifice 68 performs two functions. First, the restriction is sufficient to achieve the back pressure that is required for the most efficient operation of the waste water discharge pump. Second, the conical restriction achieved by the cuspids 54 is longitudinally convex until it merges tangentially with the cylindrical disposition of the apices 56 on the successively disposed cuspids 54. The resulting convex disposition defined by the overall passage through the back-flow preventer 10 increases the velocity of the waste water fluid as it exits the back-flow preventer 10 into the drain hose 12.

It must also be appreciated that the ribs 62 extend minimally into the flow channel. That is, with the ribs 62 extending radially inwardly approximately fifteen thousandths of an inch (0.015) beyond the curved medial surface 64 of the cuspids 54, the boundary layer formed along the cuspids 54 as the waste water is discharged through the back-flow preventer 10 will not be pierced by the ribs 62 under the typical conditions encountered with a discharge rate of approximately seven and one-half (7½) gallons per minute. As such, the resistance to flow along the cuspids 54 will not be affected by the existence of the ribs 62.

As best seen in FIG. 3, the walls of the cuspids 54 are thinner than the cylindrical body section 20. The reduced thickness of the cuspids 54 makes them easier to bend outwardly away from the center line 66 of the back-flow preventer 10, and the ribs 62 tend to stabilize the configuration of the individual cuspids 54 against deformation.

When back-flow occurs, the fluid presses against the radially outer surface 74 of the cuspids 54. This pressure forces the opposed edges 58 of the cuspids 54 together such that the edges 58, as enhanced by the additional thickness of the ribs 62 come into contact with each other. When this occurs, the breather spaces 60 close, and fluid cannot flow from the drain hose 12 back into the passageway 22.

While only a preferred embodiment of my present invention is disclosed, it is to be clearly understood that the same is susceptible to numerous changes apparent to one skilled in the art. Therefore, the scope of the present invention is not to be limited to the details shown and described but is intended to include all changes and modifications which come within the scope of the appended claims.

As should now be apparent, the present invention teaches that a back-flow preventer embodying the concepts of the present invention is capable of accomplishing the objects of the invention.

I claim:

1. A back-flow preventer, comprising:

a generally annular body portion having axially spaced upstream and downstream ends;

a substantially cylindrical passageway extending through said body portion;

a plurality of circumferentially adjacent cuspids connected to said downstream end of said body portion for selectively opening and closing said passageway;

said cuspids are conically disposed;

said cuspids have lateral edges that converge to an apex;

each said cuspid being marginated by a rib extending into said passageway; and, said ribs are disposed to increase the bending strength of said cuspids and enhance boundary layer separation of fluid flowing therethrough.

2. A back-flow preventer, as set forth in claim 1, wherein:

said circumferentially adjacent cuspids are spaced to define breather means through which heat may be dissipated.

3. A back-flow preventer, as set forth in claim 2, wherein:

said ribs are disposed to enhance the closure achieved by circumferentially adjacent cuspids.

4. A back-flow preventer, comprising:

an annular body portion having upstream and downstream ends;

said annular body portion having a passageway therethrough;

a radially extending mounting flange integrally connected to said upstream end of said annular body portion;

a frusto-conical transition presented from the downstream end of said annular body portion;

said passageway extending through said frusto-conical transition;

a plurality of cuspids extending downstream from said frusto-conical transition;

said cuspids are conically disposed;

said cuspid have lateral edges that converge to an apex;

each said cuspid being marginated by a rib extending into said passageway; and, said ribs are disposed to increase the bending strength of said cuspids and to enhance boundary layer separation of fluid flowing therethrough.

5. An assembly adapted to be connected between the outlet fitting of a waste water discharge pump in a household appliance and a sanitary system, said assembly comprising:

a back-flow preventer;

a drain hose having a connector cuff; and, a transition cuff having first and second portions;

said back-flow preventer having a generally annular body portion with axially spaced upstream and downstream ends;

a substantially cylindrical passageway extending through said body portion;

a plurality of circumferentially adjacent cuspids connected to said downstream end of said body portion for selectively opening and closing said passageway;

each said cuspid being marginated by a rib extending into said passageway;

said cuspids being conically disposed;

said cuspids have lateral edges that converge to an apex;

said ribs are disposed to increase the bending strength of said cuspids and to enhance boundary layer separation of fluid flowing therethrough;

said connecting cuff overlying said body portion;

said first portion of said transition cuff received over at least that portion of said connecting cuff that overlies the body portion of said back-flow preventer; and, said second portion of said transition cuff adapted to be connected to the discharge pump outlet fitting.

6. An assembly, as set forth in claim 5, further comprising:

a radial mounting flange presented from the upstream end of said body portion;

an annular recess in the first portion of said transition cuff to receive said mounting flange.

7. An assembly, as set forth in claim 6, wherein:

said extension cuff, said first portion of said transition cuff and said body portion of said back-flow preventer are bonded into an integral assembly.

8. An assembly, as set forth in claim 7, wherein:

a hose clamp secures said second portion of said transition cuff to said discharge pump outlet fitting.

* * * * *